Patented Sept. 9, 1924.

1,507,690

UNITED STATES PATENT OFFICE.

WILLIS H. SIMPSON, OF EAST ORANGE, NEW JERSEY.

PROCESS OF MAKING CALCIUM ARSENATE IN DRY POWDERED FORM.

No Drawing.    Application filed June 14, 1923. Serial No. 645,352.

*To all whom it may concern:*

Be it known that I, WILLIS H. SIMPSON, a citizen of the United States, and resident of East Orange, in the county of Essex and State of New Jersey, have invented certain new and useful Improvements in Processes of Making Calcium Arsenate in Dry Powdered Form, of which the following is a specification.

This invention relates to a process of making calcium arsenate, the object being to produce the product in a dry, powdered form, free from soluble arsenic salts, suitable for use as an insecticide without further treatment, such as grinding, drying, etc.

The object and distinguishing feature of my process is the rendering of the commercial process of manufacture of calcium arsenate extremely simple and efficient, and, consequently, less expensive, avoiding the necessity of several successive operations, with the corresponding number of separate pieces of apparatus and resultant successive handling or transferring of the partly treated product from one to the other and, also, avoiding the necessity of any further or final treatment of the arsenate to render it suitable for use as an insecticide, the product produced by my process being in the dry, powdered form ready for use.

To accomplish this result, I apply a hydrated oxide of arsenic (arsenic acid) to the calcium oxide (lime) while the latter is being ground. The grinding of the calcium oxide may be done in any of the grinding mills, such as the so called "ball mill," which may be provided with a hollow shaft or trunnion, or other suitable arrangement, through which, or by means of which, the arsenic acid is sprayed over the lime while the same is being ground in the mill.

The amount of arsenic acid used, or the speed of the spraying operation, is regulated according to the amount of lime being ground and the speed of grinding, so that there is always an excess of lime sufficient to take up or combine with the free water of the arsenic acid, this action of lime and arsenic acid being well known.

The amount of arsenic acid used is also regulated to produce the required amount of arsenic pentoxide, usually from 30% to 50% in the finished product.

The degree of fineness of the product so produced is such that it will pass through a "100 mesh" sieve, or finer, and is practically free from water soluble arsenic compounds.

This simultaneous treatment has been found in actual practice to very materially reduce the time and cost of production and to produce a very high grade product, all of which is of great importance in the commercial production of the insecticide.

What I claim is:—

1. The process of making calcium arsenate which consists in grinding calcium oxide and applying a hydrated oxide of arsenic thereto simultaneously during the grinding thereof, regulating the amount of the hydrated oxide of arsenic so applied to cause the removal of all of the free water therefrom by the calcium oxide, producing calcium arsenate in a dry powdered form.

2. The process of making calcium arsenate which consists in grinding calcium oxide and applying arsenic acid simultaneously thereto during the grinding thereof, regulating the amount of arsenic acid so applied to cause the removal of all of the free water therefrom by the calcium oxide, producing calcium arsenate in a dry powdered form.

3. The process of making calcium arsenate which consists in grinding calcium oxide and spraying arsenic acid over the calcium oxide simultaneously during the grinding thereof, regulating the amount of arsenic acid so applied to cause the removal of all of the free water therefrom by the calcium oxide, producing calcium arsenate in a dry powdered form.

Signed at New York, in the county of New York and State of New York, this 6th day of June, A. D. 1923.

WILLIS H. SIMPSON.